Patented June 26, 1928.

1,675,227

UNITED STATES PATENT OFFICE.

AUSTIN B. REEVE, OF CHICAGO, ILLINOIS.

CLEANING AND POLISHING COMPOSITION.

No Drawing.   Application filed December 26, 1922.  Serial No. 609,100.

In accordance with this invention, a cleaning and polishing material for painted, enamelled, varnished surfaces and the like may be prepared in the following manner.

Oil, preferably a light mineral oil, for example, of the character of spindle oil or mineral seal oil (or other suitable oil, as linseed oil or cedar oil), is emulsified in water, the proportions being suitably from 0.8 to 1.25 parts of oil to each part of water by weight. Emulsification is suitably effected by means of suitable emulsifying agents, such as vegetable gums, colloidal clay, or mixtures thereof. For example, gum tragacanth or gum arabic mixed with colloidal clay may be employed. Other vegetable gums have been found suitable, for example, Indian gum, or mixtures of these gums. The proportion of emulsifying agent or agents may be from 1 to 5% of the whole. Although the vegetable gums alone may be employed, I have found it most advisable to employ mixtures thereof with colloidal clay in proportions varying from 1 part of gum to 1 part of clay to 1 part of gum to 4 parts of clay. In the emulsion I incorporate a suitable quantity of an astringent which appears to greatly improve the gloss obtained by the use of the polish. The astringents which I employ are those which are generally termed in pharmaceutical practice "astringent" and are in general somewhat acid substances, which in their concentrated form have an astringent, but not a caustic or escharotic action. For example, I have found suitable for such use astringents such as alum (including both aluminum and chrome alums) tannic acid, salicylic acid, acetylsalicylic acid, tartaric acid, gallic acid, pyrogallic acid, benzoic acid, etc. I have found that such material may be employed in proportions varying from 1% of the mixture up to sufficient to saturate the water present. I may likewise add borax, the maximum proportion permissible being that which will leave the mixture with an acid reaction. Preferably about 1 to 3% is employed. A suitable hygroscopic material, such as calcium chloride or magnesium chloride may be dissolved in the water present up to a proportion of about 5% of the mixture, preferably from 1 to 3% being employed. If desired, a small proportion, say 1 to 5% of an abrasive, such as rotten stone, finely divided silica, etc. may be incorporated in the mixture. If desired paraffine wax may be dissolved in the oil prior to the formation of the mixture up to a proportion of about 12% of the oil. The abrasive, the borax, the hygroscopic agent and the paraffine are optional constituents, each of which appears to improve to some extent the polishing and cleaning action of the mixture, but may be omitted if desired.

As an example of a specific mixture which I have found suitable for use, the following may be given:

Water 35 to 45%;
Oil (which may, if desired, contain up to 10% paraffine) 35 to 50%;
Emulsifying agent comprising 1 part vegetable gum such as gum tragacanth to 3 parts colloidal clay, 2 to 5%;
Tannic acid, sufficient to saturate the water;
Sodium borate 1 to 5%;
Abrasive 1 to 5%;
Magnesium chloride, 2 to 3%.

Although the present invention has been described in connection with the details of a specific example embodying it, it is not intended that these details shall be regarded as limitations upon the scope of the invention, except in so far as included in the accompanying claims.

I claim:

1. As a cleaning and polishing agent for varnished surfaces and the like, a non-saponaceous emulsion comprising water, oil, a vegetable gum in proportion to act as an emulsifying agent and a non-escharotic astringent.

2. As a cleaning and polishing agent for varnished surfaces and the like, an emulsion comprising water, oil, a vegetable gum and colloidal clay in proportions to act as emulsifying agents and an astringent.

3. A cleaning and polishing material for varnished surfaces and the like consisting of an emulsion comprising oil, water, an emulsifying agent including a vegetable gum and colloidal clay, an astringent, a hygroscopic substance dissolved in the water and borax in quantity insufficient to neutralize the acidity.

4. A cleaning and polishing material for varnished surfaces and the like consisting of an emulsion comprising water, 1 part; oil, 1 to 1.3 parts; vegetable gum admixed with colloidal clay, 1 to 5%; an astringent, borax, 1 to 3% and a hygroscopic substance, 1 to 3%.

5. A cleaning and polishing material for varnished surfaces and the like consisting of water, 45%; oil (containing 10% of paraffin wax) 35% to 50; emulsifying agent comprising 1 part vegetable gum to 3 parts colloidal clay, 2 to 5%; tannic acid, sufficient to saturate the water; borax 1 to 5%; abrasive, 1 to 5% and magnesium chloride, 2 to 3%.

AUSTIN B. REEVE.